Nov. 22, 1949     E. L. FRANZ     2,488,858
SAFETY BELT FOR AIRPLANES
Filed Sept. 25, 1945
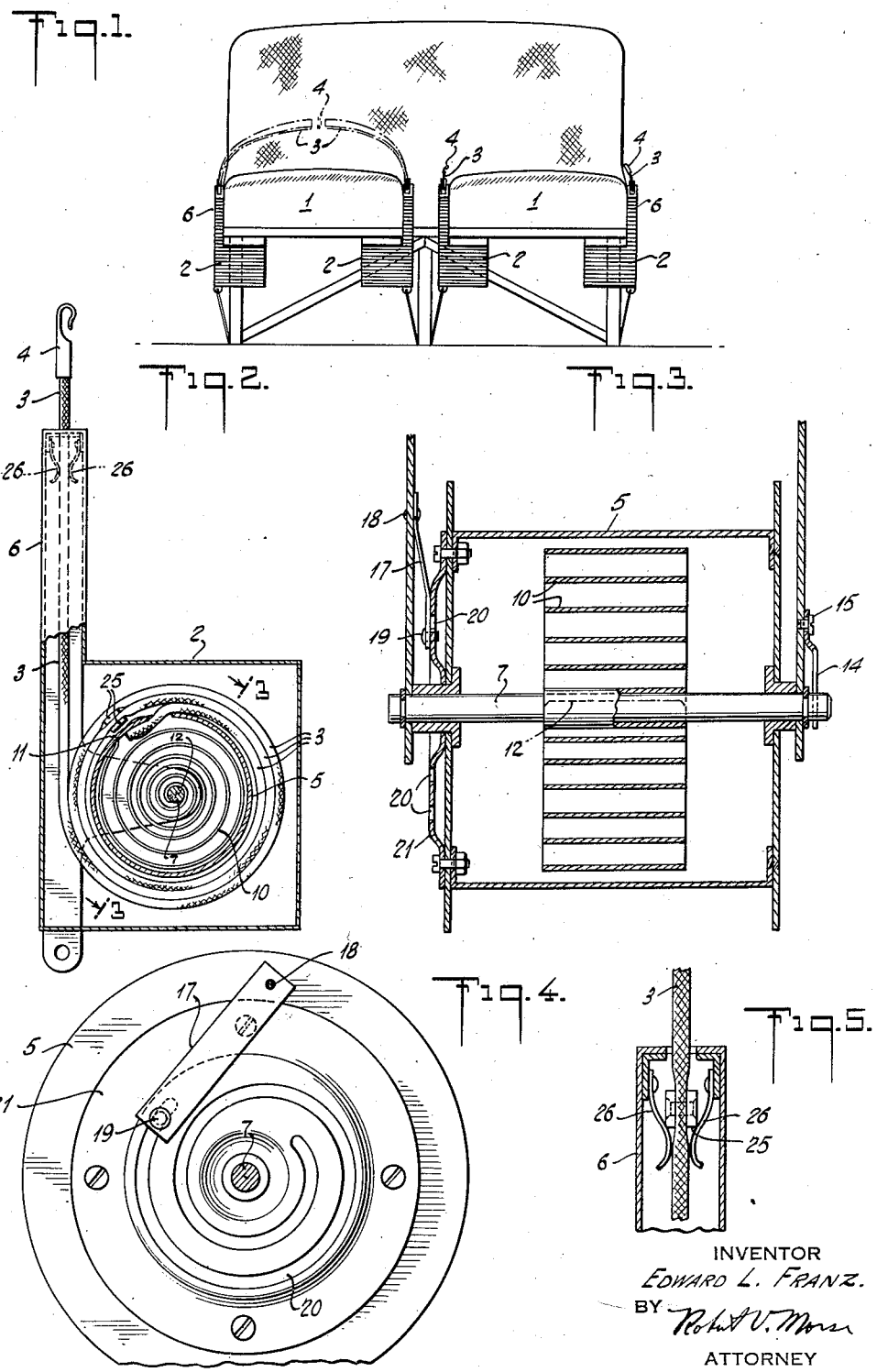
INVENTOR
EDWARD L. FRANZ.
BY
ATTORNEY Patented Nov. 22, 1949

2,488,858

UNITED STATES PATENT OFFICE 2,488,858

SAFETY BELT FOR AIRPLANES

Edward L. Franz, Hillsdale, N. J., assignor to Robinson Aviation, Inc., Teterboro, N. J., a corporation of New York Application September 25, 1945, Serial No. 618,472

3 Claims. (Cl. 155—189)

This invention relates to safety belts such as used in airplanes. Such belts are customarily supplied to hold passengers in their seats in case of emergency. As one enters an airplane, the loose ends of the belts are ordinarily found on the seats or dangling toward the floor. It is believed that this condition can be improved from the standpoints of both safety and convenience. The passenger sometimes sits down on the belts which become entangled with his clothes, and it is somewhat of a struggle for the passenger to find the two halves of the buckle and engage them to fasten himself in place.

The purpose of my improvement is to automatically retract both portions of the safety belt when not in use by the passenger. The two two halves of the belt are then withdrawn in take-up reels with only the ends of the buckles visible at the sides of the seat. Under this arrangement the buckles and straps are held clear of the seat but the buckles are visible and within easy reach. After the passenger is seated, the two portions of the belt are clasped and pulled clear out as far as they will go, at which point the buckle is clamped. This eliminates the usual condition of having the two halves of the unfastened belt lying loose on the seat to inconvenience the passenger when he first sits down. While tension is always available to retract the belts out of sight when desired, means are provided to relieve the passenger from this tension when the belt is in use.

I am aware that retracting reels have been used on safety belts for the purpose of permitting additional freedom of motion to the pilot or passenger, allowing the safety belt to be extended temporarily while still clamped, and then retracted by a reel to its previous operating position. Such devices did not take the belts out of the way when they were not in use, but left them around on the seats as before. The present invention is not concerned with permitting additional freedom of action when the belt is in use, but is primarily concerned with the disposition of the belt when not in use.

In addition to the general purposes of the invention as above outlined, various specific objects incidental to the mechanical functioning will become apparent as the description proceeds.

Referring now to the drawings,

Fig. 1 shows an airplane seat with the present invention installed and the safety belts in their housings as when not in use.

Fig. 2 is a side view of the housing partly in section to show the retracting reel.

Fig. 3 is a detail cross-section on the line 3—3 of Fig. 2 showing the adjustable tension spring in the reel.

Fig. 4 is a detail side view of a device limiting the retraction.

Fig. 5 is a detail side view partly in cross-section of the stop or detent limiting extension and relieving the belt from tension when not in use.

Similar reference numerals refer to similar parts thruout the various views.

Referring now to Fig. 1, the airplane seat 1 has provided at the two sides of each passenger a pair of casings 2 for housing retractible safety belts 3, the belts being shown extended in broken lines in Fig. 1 but normally retracted within the housings 2 when not in use. When so retracted the buckles or clamps 4 on the ends of the belts remain projecting from the housings 2 so as to be visible and accessible, as shown at the right seat in Fig. 1.

The safety belt 3 and its housing 2 are shown more in detail on a larger scale in Fig. 2, in which the belt 3 is depicted in its retracted position, being wound around the reel 5. The main body of the housing 2 projects under the seat 1 as shown in Fig. 1 and is secured thereto, with its projecting neck or guide portion 6 extending up the side of the seat, generally somewhat diagonally from back to front. The shaft or pivot 7 on which the drum or reel 5 rotates extends in general in a direction from front to back of the seat, so that the flat of the belt 3 will lie in a plane along the side of the seat 1 as it is extended and so lie smoothly over the body or thighs of the passenger.

In Fig. 2 the belt 3 is shown almost entirely wound up on the reel 5 with the buckle or clamp 4 at the end projecting from the neck 6 so that it can be readily drawn out and clasped. The belt 3 is wound up on the reel 5 by the action of the spiral spring 10 whose outer end 11 is attached to the drum 5 and whose inner end 12 is attached to the shaft 7, as shown in Fig. 2 and Fig. 3. Referring to Fig. 3 it will be seen that the shaft 7 can be turned by the adjusting lever 14 to give the desired degree of tension to the spring 10, after which adjustment the lever 14 is locked in place by the screw 15.

While the buckle 4 if large enough will prevent the belt 3 from retracting entirely within the housing, it is generally desirable to provide a built-in stop to limit the retraction independent of the belt tension, so that the belt can still project a little when retracted and will not entirely disappear within the housing if the buckle happens to be removed. Such a limit stop is shown in Fig. 3 and Fig. 4 and may consist of an arm 17 pivotally attached to the casing 2 at the point 18 and having a cam follower lug 19 operating in the spiral cam groove 20 as shown in Fig. 4, so as to only permit the reel 5 to make a certain number of turns. This cam groove 20 is cut in the face plate 21 attached to the left side of the reel 5 shown in Fig. 3.

When the safety belt 3 is extended and in use, clamped around the body of the passenger, the action of the reel spring 10 would normally tend to maintain a tension on the belt 3 which, though gentle, might become uncomfortable to the passenger. To obviate any such discomfort, lugs 25 are attached to the belt as shown in Fig. 2 in the retracted position and more in detail in Fig. 5 in the extended position, when they come into use. Referring more particularly to Fig. 5, there are spring fingers 26 located in the neck 6 of the housing 2 on both sides of the belt 3. These fingers 26 are adapted to engage the lugs 25 on the belt 3 and act as a detent mechanism to take the pull of the spring 10 off the belt 3 when it is in use. The detent action is readily disengaged by a slight pull and released when the belt is unbuckled, whereupon the belt 3 will retract itself within the housing 2.

A pair of belts at each seat are generally preferable, though of course a longer single belt may be used if desired, with the free end hooking on the heat. The enclosing housings keep the belts clean.

The general action will now be apparent. The devices having been installed under the seat with their flat guides 6 along the sides of the seat, the passenger on entering the airplane finds the seats clear of any harness or straps, and takes his seat without difficulty. When he desires to use the safety belt, he grasps the slightly projecting ends, pulls out the safety belts from their housings and buckles them on. When he unclasps the safety belts they automatically retract into their housings out of the way. When the passenger leaves the airplane the seats are left clear.

While I have in the foregoing described certain specific forms by way of example, it will be understood that they are merely for purposes of illustration to make clear the principles of the invention, which is not limited to the particular forms shown but is susceptible to various modifications and adaptations in different installations as will be apparent to those skilled in the art without departing from the scope of the invention as stated in the following claims.

I claim:

1. In a safety belt mechanism, the combination of a seat, a safety belt adapted to be engaged around the body of the occupant of the seat when in use, a detent on said belt for taking the tension off the belt when around the body, a retracting mechanism attached to said belt for withdrawing the belt from the upper side of the seat when the belt is not in use, and a guide for said belt at the side of the seat for holding the retracted belt in a position readily accessible to the occupant in case of need, whereby the seat will be kept clear for occupancy when the belt is not in use.

2. In a safety belt mechanism, the combination of a seat, a casing below said seat, a reel in said casing, a retracting spring for said reel arranged to withdraw the belt from the upper side of the seat when the belt is not in use, a safety belt on said reel, said belt being operatively connected to said reel and adapted to be engaged around the body of the occupant of the seat when in use, a detent on said belt for taking the tension off the belt when around the body, and a guide for said belt holding the end of the belt in a readily accessible position at the side of the seat when retracted, whereby the seat will be kept clear for occupancy when the belt is not in use.

3. In a safety belt mechanism, the combination of a seat, a casing below said seat, a reel in said casing, a retracting spring for said reel, a safety belt on said reel, said belt being operatively connected to said reel and adapted to be engaged around the body of the occupant of the seat when in use, a detent on said belt for taking the tension off the belt when around the body, a stop mechanism limiting the retraction of said belt on said reel and arranged so that the belt may be entirely withdrawn from the occupied portion of the seat when not in use, and a guide for said belt holding the end of the belt in a readily accessible position at the side of the seat when retracted, whereby the seat will be kept clear for occupancy when the belt is not in use.

EDWARD L. FRANZ.

REFERENCES CITED

The following references are of record in the file of this patent:

UNITED STATES PATENTS

| Number | Name | Date |
|---|---|---|
| 2,071,903 | Shively | Feb. 23, 1937 |
| 2,263,348 | Barros | Nov. 18, 1941 |

FOREIGN PATENTS

| Number | Country | Date |
|---|---|---|
| 582,985 | France | Oct. 24, 1924 |